United States Patent
Mimis

(10) Patent No.: US 11,290,444 B2
(45) Date of Patent: Mar. 29, 2022

(54) METHOD AND SYSTEM FOR STRONG AUTHENTICATION AND SECURE COMMUNICATION

(71) Applicant: Dan Vasile Mimis, Austin, TX (US)

(72) Inventor: Dan Vasile Mimis, Austin, TX (US)

(\*) Notice: Subject to any disclaimer, the term of this patent is extended or adjusted under 35 U.S.C. 154(b) by 262 days.

(21) Appl. No.: 16/820,620

(22) Filed: Mar. 16, 2020

(65) Prior Publication Data

US 2020/0304488 A1    Sep. 24, 2020

Related U.S. Application Data

(60) Provisional application No. 62/820,213, filed on Mar. 18, 2019.

(51) Int. Cl.
| | |
|---|---|
| *H04L 9/32* | (2006.01) |
| *H04L 9/08* | (2006.01) |
| *H04L 29/06* | (2006.01) |

(52) U.S. Cl.
CPC ........... *H04L 63/083* (2013.01); *H04L 9/088* (2013.01); *H04L 9/3271* (2013.01)

(58) Field of Classification Search
CPC ...... H04L 63/083; H04L 9/088; H04L 9/3271
See application file for complete search history.

(56) References Cited

U.S. PATENT DOCUMENTS

| | | | | | |
|---|---|---|---|---|---|
| 4,476,462 | A | * | 10/1984 | Feldman | ............... G06F 3/0227 345/160 |
| 2008/0098464 | A1 | * | 4/2008 | Mizrah | ................... G06F 21/36 726/5 |
| 2015/0341327 | A1 | * | 11/2015 | Barton | .................. H04L 9/3226 713/168 |
| 2018/0176222 | A1 | | 6/2018 | Bhaskar et al. | |
| 2019/0171825 | A1 | | 6/2019 | Khi et al. | |
| 2020/0382500 | A1 | * | 12/2020 | Streete | .................. H04L 63/083 |

OTHER PUBLICATIONS

Comparative Analysis and Framework Evaluating Mimicry-Resistant and Invisible Web Authentication Schemes, Alaca et al, Aug. 2017 (Year: 2017).*

Ozcelebi and Hartog, "Lecture Notes: Computer Networks and Security (2IC60)", Publication Date: 2019, Access Date: Sep. 15, 2019, Website: https://www.win.tue.nl/~tozceleb/2IC60/ebookbundle.pdf.

* cited by examiner

*Primary Examiner* — Jahangir Kabir

(57) ABSTRACT

A system and method for the generation of cryptographic keys for authentication and secure communications. The invention is an improvement over other existing authentication and encryption methods because it is not susceptible to hackers who have access to previous login sessions since authentication data is unique to each session, it is not susceptible to hackers using brute force attacks to determine underlying algorithms due to the complexity of the method and the extensive ability to customize the underlying data, and it allows for a key length as large as the message and unique to each login session which is what Claude Shannon showed to achieve the so-called perfect secrecy. The disclosed invention is also an improvement over existing authentication and encryption methods because it allows for multiple valid responses in each login session.

5 Claims, 14 Drawing Sheets

FIG. 1 Step 9
Client Application Response Generation

FIG. 1 Step 9
Client Application Response Generation

800
Active Element Mapping Array

| C1, N1 | C2, N2 | C3, N3 | C4, N4 | C5, N5 | C6, N6 | C7, N7 | C8, N8 | ... | C#, N# |

801
Active Element Mapping Array Length (Note: C# stands for Character and is a unique character from the character list. N# stands for Number and is a unique number.)

```
[('a', -73), ('b', -55), ('c', 93), ('d', -69), ('e', 27), ('f', -54), ('g', 12), ('h', 10), ('i', 43), ('j', -23),
 ('k', 22), ('l', -30), ('m', -38), ('n', -5), ('o', 39), ('p', -18), ('q', -52), ('r', 20), ('s', 54), ('t', 70),
 ('u', 50), ('v', -8), ('w', 76), ('x', 53), ('y', 89), ('z', -96), ('A', 1), ('B', 36), ('C', 97), ('D', 48),
 ('E', 86), ('F', -84), ('G', 13), ('H', -45), ('I', 88), ('J', 45), ('K', -35), ('L', -76), ('M', 16), ('N', -83),
 ('O', 42), ('P', 7), ('Q', 49), ('R', -29), ('S', 38), ('T', -53), ('U', 98), ('V', 9), ('W', -39), ('X', 64),
 ('Y', -66), ('Z', 69), ('0', 15), ('1', -1), ('2', -85), ('3', 61), ('4', 2), ('5', -28), ('6', -63), ('7', -26),
 ('8', 83), ('9', -4), ('!', 30), ('@', -65), ('#', 19), ('$', 58), ('%', 66), ('^', -21), ('&', 90), ('*', 57),
 ('(', 60), (')', -67)]
```

810
Example Active Element Mapping Array

Fig. 8

1000
Formula Set to Character Mapping Array

| Formula Set Identifier | List of Mapped Characters |
|---|---|
| Formula Set Identifier | List of Mapped Characters |
| Formula Set Identifier | List of Mapped Characters |

...

1010
Example Formula Set to Character Mapping Array

| Formula Set 1 | ['F', 'G', 'R', 'Z', 't', 'S', '6', 'Q', 'i'] |
|---|---|
| Formula Set 2 | ['$', '2', '4', 'K', '3', 'p', '0', 'O', 'D'] |
| Formula Set 3 | ['d', 'x', '3', 'b', 'p', '%', '&', 'n', '#'] |
| Formula Set 4 | ['z', 'y', 'M', 'I', 'v', 'c', 'e', 'H', 'g'] |
| Formula Set 5 | ['<', '@', 'W', 'm', 'L', ':', '5', 'U', 'r'] |
| Formula Set 6 | ['N', '8', 'E', '1', '*', 'Y', 'f', '(', 'w'] |
| Formula Set 7 | [')', '7', 's', 'B', 'J', 'j', '9', 'q', 'T'] |
| Formula Set 8 | ['C', 'A', 'X', 'k', 'u', 'h', 'V', 'l', 'a'] |

1011
Example Formula Set Id

[ 'Formula Set 6' ]

Fig. 10

1100
Formula Set to Formula Mapping Array

| Array Position | Formula Set ID |
|---|---|
| 1 | formula |
| 2 | formula |
| 3 | formula |
| 4 | formula |
| 5 | formula |
| 6 | formula |
| 7 | formula |
| # | formula |

1110
Example Formula Set to Formula Mapping Array

| Array Position | Formula Set 1 | Formula Set 2 | Formula Set 3 | Formula Set 4 |
|---|---|---|---|---|
| 1 | 4*ActiveElement_1 | ActiveElement_4-1 | ActiveElement_2-5 | (3*ActiveElement_2)-1 |
| 2 | 3-ActiveElement_2 | (ActiveElement_2/8)*5 | (ActiveElement_3*6)/5 | (ActiveElement_2*8)/5 |
| 3 | 3+(2*ActiveElement_3) | 4*ActiveElement_1 | 12*ActiveElement_1 | 99*ActiveElement_1 |
| 4 | ActiveElement_2+ActiveElement_3 | 5-ActiveElement_2 | 34-ActiveElement_1 | 34-ActiveElement_1 |
| 5 | 78*ActiveElement_4 | 9+(12*ActiveElement_3) | 6+(7*ActiveElement_3) | 8+(21*ActiveElement_4) |
| 6 | ActiveElement_3/2 | 22*ActiveElement_4 | (3(14*ActiveElement_4))/5 | 22*ActiveElement_4 |
| 7 | ActiveElement_4-12 | ActiveElement_3/8 | 2*(ActiveElement_3/8) | 32*(ActiveElement_3/8) |

| Array Position | Formula Set 5 | Formula Set 6 | Formula Set 7 | Formula Set 8 |
|---|---|---|---|---|
| 1 | ActiveElement_4-12 | 4*(ActiveElement_2) - 13 | ActiveElement_4-1 | ActiveElement_2-5 |
| 2 | (ActiveElement_2/8)*5 | (3*(ActiveElement_1) - 2*(ActiveElement_0))/4 | ActiveElement_2*8 | (ActiveElement_3*6)/5 |
| 3 | 45*ActiveElement_1 | ((ActiveElement_3))**2 - 22 | 4*ActiveElement_1 | 12*ActiveElement_1 |
| 4 | 56-ActiveElement_2 | ((ActiveElement_2-5))**3 + 16 | 5-ActiveElement_2 | 34-ActiveElement_1 |
| 5 | 42+(7*ActiveElement_3) | 5*formula_1(formula_set_6) - 34 | 9+ActiveElement_3 | 6+(7*ActiveElement_3) |
| 6 | 21*ActiveElement_3 | 7*formula_2(formula_set_6) +19 | 22*ActiveElement_4 | 14*ActiveElement_4 |
| 7 | 12-(ActiveElement_3/8) | 6*(formula_4(formula_set_6) - formula_2(formula_set_6)) - 29 | ActiveElement_3/8 | 2*(ActiveElement_3/8) |

1111
Example Formulas

Fig. 11

| C1, N1 | C2, N2 | C3, N3 | C4, N4 | C5, N5 | C6, N6 | C7, N7 | C8, N8 | ... | C#, N# |

1200
Response Character Mapping Array

1201
Response Character Mapping Array Length

[('a', 36), ('b', 57), ('c', 33), ('d', 7), ('e', 32), ('f', 42), ('g', 53), ('h', 31), ('i', 17), ('j', 65),
('k', 26), ('l', 68), ('m', 39), ('n', 1), ('o', 43), ('p', 71), ('q', 9), ('r', 29), ('s', 47), ('t', 8),
('u', 38), ('v', 70), ('w', 46), ('x', 55), ('y', 28), ('z', 23), ('A', 63), ('B', 27), ('C', 49), ('D', 66),
('E', 24), ('F', 37), ('G', 58), ('H', 45), ('I', 61), ('J', 20), ('K', 54), ('L', 12), ('M', 11), ('N', 52),
('O', 48), ('P', 72), ('Q', 51), ('R', 13), ('S', 56), ('T', 40), ('U', 44), ('V', 59), ('W', 14), ('X', 6),
('Y', 35), ('Z', 3), ('0', 67), ('1', 10), ('2', 62), ('3', 25), ('4', 16), ('5', 64), ('6', 60), ('7', 2),
('8', 15), ('9', 21), ('!', 69), ('@', 18), ('#', 22), ('$', 4), ('%', 30), ('^', 19), ('&', 41), ('*', 5),
('(', 50), (')', 34)]

1210
Example Response Character Mapping Array

Fig. 12

1300
Example Active Element Values

Active Element Mapping Array with
[('5',58),('Y',45),('9',-4),('W',43)]
has

| Active Element | Active Element Value |
|---|---|
| 1 | 58 |
| 2 | 45 |
| 3 | -4 |
| 4 | 43 |

1310
Example Step 305 and Step 403

| Response Answer Element #/ Formula # | Formulas in Formula Set 6 | Formula Set 6 with active element values | Values | Transformed Values Using abs(int(Value))%72+1 | Transformed Values | Values Mapped to Response Character Mapping Array |
|---|---|---|---|---|---|---|
| 1 | 4*(ActiveElement_2)-13 | 4*(4)-13 | -29 | abs(int(-29))%72+1 | 30 | % |
| 2 | ((3*(ActiveElement_1) -2*(ActiveElement_0))/4 | (3*45-2*58)/4 | 4.75 | abs(int(4.75))%72+1 | 5 | * |
| 3 | ((ActiveElement_3))2-22 | 452-22 | 1827 | abs(int(1827))%72+1 | 28 | y |
| 4 | ((ActiveElement_2-5))3+16 | (-4-5)3+16 | -713 | abs(int(-713))%72+1 | 66 | D |
| 5 | 5*(formula_1(formula_set_6))-34 | 5*(-29)-34 | -179 | abs(int(-179))%72+1 | 36 | a |
| 6 | 7*formula_2(formula_set_6)+19 | 7*4.75+19 | 52.25 | abs(int(52.25))%72+1 | 53 | g |
| 7 | 6*(formula_4(formula_set_6) -formula_2(formula_set_6))-29 | 6*(-713-4.75)-29 | -4335.5 | abs(int(-4335.5))%72+1 | 16 | 4 |

Fig. 13

METHOD AND SYSTEM FOR STRONG AUTHENTICATION AND SECURE COMMUNICATION

CROSS-REFERENCE TO RELATED APPLICATION

This application claims the benefit of U.S. Provisional Application No. 62/820,213, filed Mar. 18, 2019.

BACKGROUND

1. Field of the Invention

The present application relates generally to the field of cybersecurity. More specifically, the invention relates to cryptographic methods for authentication and encryption.

2. Background of the Invention

Modern digital communications incorporate many different device types communicating data via a wide variety of network environments. In order to protect the data interchanged during these communications, modern communication protocols use credentials to authenticate users. Authenticating users limits impersonators from misusing user accounts and data. At its basic level, basic authentication authenticates using usernames and passwords.

Authentication involving usernames and passwords suffers from several vulnerabilities. One vulnerability is that impersonators can determine user passwords, especially when users create weak passwords. Another related vulnerability is created by users using the same password across multiple applications. Here impersonators may determine a user's password and have access to multiple accounts. Users do not change their passwords often, which allows impersonators large time windows in which they can misuse user accounts and data once they a user's credentials.

Most web-based basic authentication use SSL encryption to protect the transmission of username and passwords during their communication between devices. Without SSL encryption, usernames and passwords would be sent in clear text, which can be easily read if intercepted. While the use of SSL encryption does add a layer of security, it is still vulnerable to impersonators. Some of these vulnerabilities include: fake certificates can allow bad actors to impersonate web sites; sites may not employ "perfect forward secrecy," meaning unique encryption keys are not created for each session; and bad actors can use malicious hotspots to perform man-in-the-middle attacks on people who connect to it;

In response to the vulnerabilities of basic authentication, modern digital communication employs Two-Factor Authentication (2FA). Two-Factor Authentication is a subset of multi-factor authentication, where another piece of evidence (i.e., credential) is used to confirm a user's identity. This second credential can be in a variety of forms, such as an additional piece of personal information such as zip code, a unique code that is sent to a user's cell phone or email, or a onetime password generated periodically from a key fob.

2FA adds another layer of security to authenticate users at login. However, 2FA is also vulnerable to bad actors. One of the common vulnerabilities is caused by bad actors using phishing to get user login information. Phishing is the practice of sending fraudulent emails that induce users to reveal personal information. Many times, this is accomplished through inducing users to click on a link that is constructed to pose as a link from a reputable company that then induces users to reveal personal information, such as usernames, passwords, and the 2FA credential. Once a bad actor has the user's login information, they can use it to log in to the user account and impersonate them.

In addition to the security vulnerabilities during authentication, encrypted digital communications also are vulnerable. Cryptography is the term used for techniques used in securing information and communications through the use of deterministic algorithms for cryptographic key generation. Cryptography is used to make it difficult for bad actors to decipher the communication and increase the probability that only the intended parties can read and process it. Current conventional cryptographic schemes such as data encryption standard, advanced encryption standard, and Rivest, Shamir, and Adleman encode messages work with public and private keys. The effort required to decrypt information or communications is related to the encryption key size and the computing power applied to decryption. If an encryption key is not unique to a session, then once it is decrypted, bad actors can use the encryption key to decrypt communications that were previously gathered as well as current and future communications between the entities. It is thought that with the advancement in quantum computing that within the next few years that the techniques currently used for encryption will be easily decrypted by quantum computers. In response to this, researchers are looking at techniques that create random one-time encryption keys that are as long as the text to be transmitted, never reused in whole or in part, and kept secret. These techniques are known as One-Time Pad (OTP).

Given the security vulnerabilities in the current authentication and encryption methods for digital communications and the projected increasing vulnerability caused by the increasing computing power, technical solutions are needed to address these vulnerabilities.

3. Description of Related Art

Two-factor authentication is a form of multi-factor authentication and is closely aligned with the field of cryptography. Methods for two-factor authentication have been available for several decades, and cryptography has been around for thousands of years.

So as to reduce the complexity and length of the Detailed Specification, and to fully establish the state of the art in certain areas of technology, Applicant(s) herein expressly incorporate(s) by reference all of the following materials identified in each numbered paragraph below.

US Patent Publication Number: US 2018/0176222 A1. Patent Publication US 2018/0176222 A1 discloses a method for providing two-factor authentication. The method comprises a user device, an authentication server, and a network interconnecting the user device and authentication server. The method creates an authentication token using part of the user's password, blinding of the remainder of the password, and sending the token to the authentication server. The method further authenticates the authentication token by computing the password and authenticating it.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s)

will amend the specification to expressly recite the essential material that is incorporated by reference as allowed by the applicable rules.

SUMMARY

The invention described below provides a computer-implemented method for the generation of cryptographic keys for authentication and secure communications. The invention provides for embodiments for both Challenge-Response authentication and encryption.

The Challenge-Response authentication embodiment of the invention is implemented by processes running on a server and client. This embodiment has several advantages that cumulatively make it a significant improvement over existing Challenge-Response authentication methods.

First, the authentication embodiment makes it near impossible for an attacker to replicate a login session. This is true even when the hacker has user login information such as User ID and password and has recorded both screen captures and keylogging from previous user login sessions. This is due to the way the response (second factor authentication) is calculated. Likewise, the method's Authenticated One Time Challenge feature makes it not susceptible to phishing.

Second, unlike some of the other authentication methods, this embodiment doesn't require third party or time synchronization, such as authentication methods that use a key fob for one-time passwords.

Third, the embodiment is not susceptible to brute force attacks. The reason is that the underlying formulas that are used to generate authentication keys are configured for each implementation and are based on formulas that are chosen from an infinite number of formulas. This feature alone makes the statistical probability that a hacker will deduce the configured underlying formulas very low.

Fourth, this method reduces the need for server policies that require periodic updates. This is due to the authentication method's use of a login counter that is automatically updated after each login session. The effect of the login counter is to change the underlying formulas that are used for each login session. Using the login counter can be as simple as adding its value to each formula. The login counter can start with a predetermined seed value and increment with any predetermined rate (not necessarily 1).

Fifth, the authentication method is unique among other inventions because it requires that both parties (server and client) contribute with a random input: server with a random challenge and client with a random character which results in a unique authentication method that accepts multiple valid responses in each login session.

According to another disclosed Challenge-Response authentication embodiment, the challenge is displayed as a table allowing for data input by means of an optical interface such as Optical Character Recognition (OCR).

On the client's end it is a token that will capture the Authenticated One Time Challenge (AOTC) and will do all calculations. The client's token has a camera, a screen capable of displaying the required number of characters a Response has and, depending on its complexity, the token can have a different number of buttons.

In another embodiment, the invention is directed to computer-implemented processes used to create cryptographic keys for encryption. The encryption embodiment provides a nearly unbreakable encryption key addressing the security vulnerability where hackers use quantum computers to decrypt data. Each encryption is based on a unique challenge and set of formulas and can use a key as long as the message. This embodiment implements what Claude Shannon showed was necessary to achieve the so-called "perfect secrecy."

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 8 depicts the structure for the active element mapping array and an example of it.

FIG. 10 depicts the structure for the formula set to character mapping array and an example of it.

FIG. 11 depicts the structure for the formula set to formula mapping array and an example of it.

FIG. 12 depicts the structure for the response character mapping array and an example of it.

FIG. 13 depicts an example of calculations for the response answer elements during client application response generation and during authentication server application response verification.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
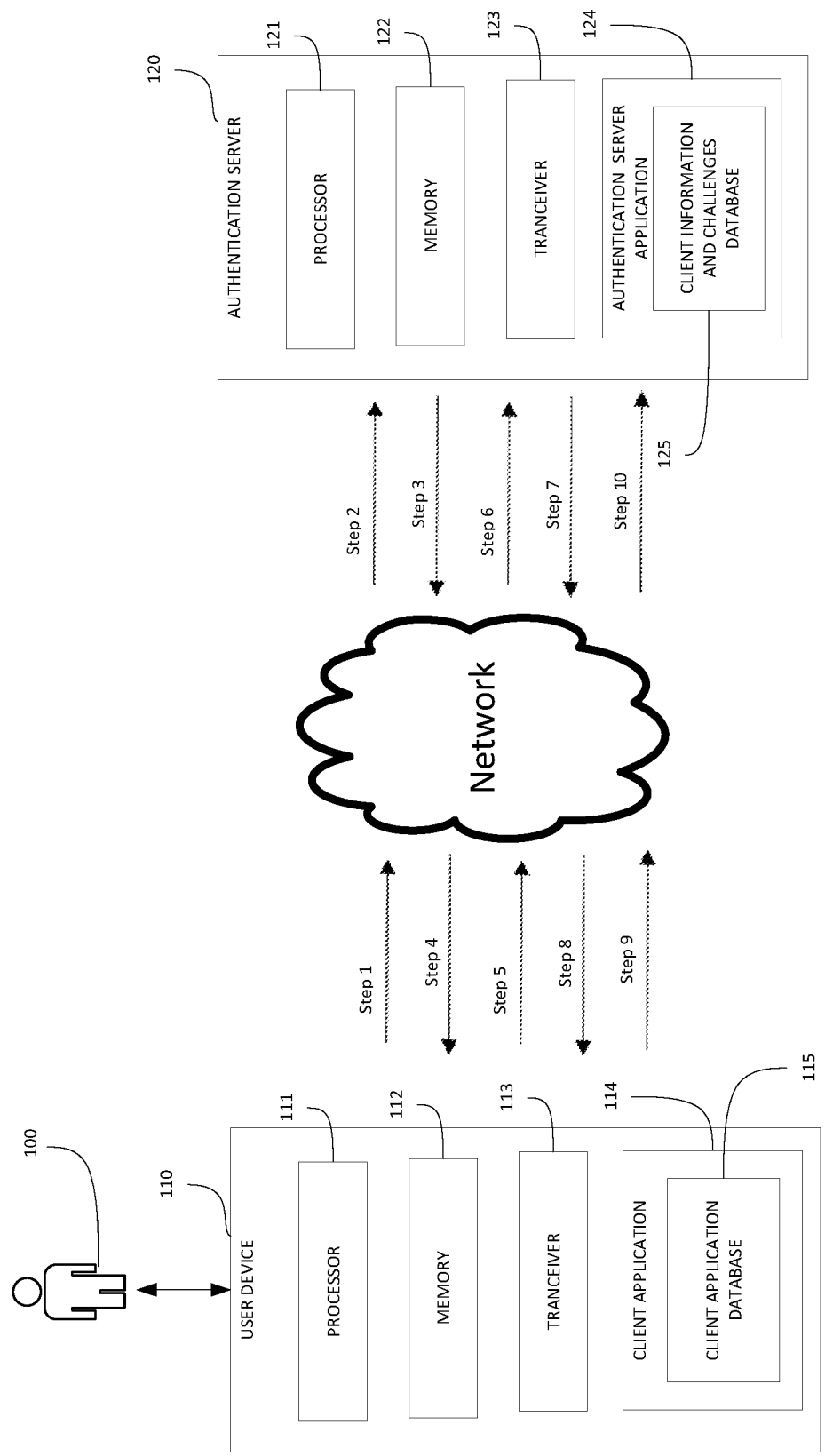
FIG. 1 depicts an exemplary embodiment of a method for strong authentication and secure communication.

FIG. 1 illustrates an exemplary embodiment of a system for providing strong authentication. The system in this embodiment comprises a user device 110 comprising a processor 111, a memory 112, a transceiver 113, a client application 114 and a client application database 115; and an authentication server 120 comprising a processor 121, memory 122, a transceiver 123, an authentication server application 124, and a client information and challenges database 125. The system allows an authentication server 120 to authenticate a user's 100 client application 114.

Exemplary Embodiment of a Method for Strong Authentication.

FIG. 1 further illustrates the communication paths of the system. The communication paths between the user device 110 and the authentication server 120 may be wired using a connection such as a Universal Serial Bus (USB) connection. Alternatively, in an exemplary embodiment, the communication paths between the user device 110 and the authentication server device 120 may be a wireless link such as Bluetooth®, WiFi®, Near Field Communication, or cell phone network.

FIG. 1 further illustrates the initialization of the authentication data between the client application 114 and the authentication server application 124 and the authentication of the client application 114 by the authentication server application 124. Steps 1 through 4 illustrate the initialization of the authentication data which occurs once or as dictated by security policies. Specifically, once initialized the initialization data is set in stone and does not change with each login session. Steps 5 through 10 illustrate the authentication of the client application 114.

In Step 1, the client application 114 sends a request for synchronization of the authentication data in the client application database 115 of the user device 110 and the client information and challenges database 125 in the authentication server 120. In Step 2, the initialization request is directed to the authentication server. In "Step 3", the authentication server application 124 accesses the client information and challenges database 125 to obtain initialization data and sends the initialization data to the client application 114 user device 110. In "Step 4", the initialization data is directed to the user device 110 and is stored in the client application database 115 by the client application 114.

The initialization data comprises a character list, a response length, a challenge length, a random character position, an active element mapping array, an active elements position list, a formula set to character mapping array, a formula set to formula mapping array, and a response character mapping array.

Figure 5:
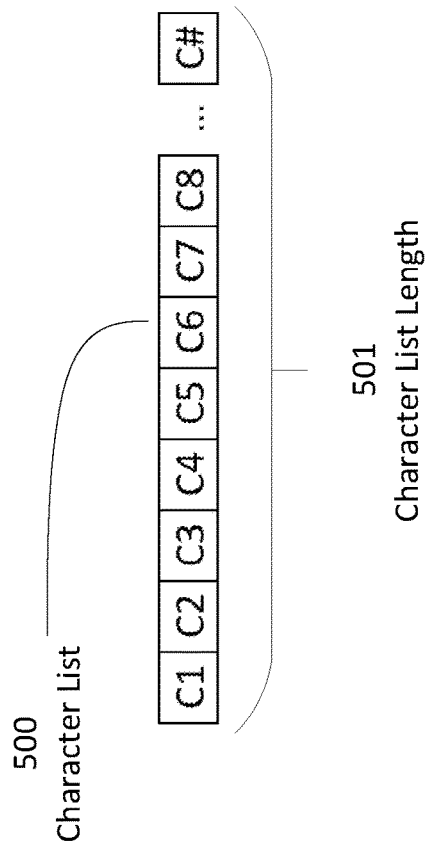
FIG. 5 depicts the structure for the character list and an example of it.

FIG. 5 illustrates the structure of a character list 500, a character list length 501, and an example 510 of the character list 500 wherein the character list 500 is a list of seventy-two unique characters. The character list 500, the character list length 501, is determined and stored at the initialization of the authentication data between the client application 114 and the authentication server application 124.

Figure 6:
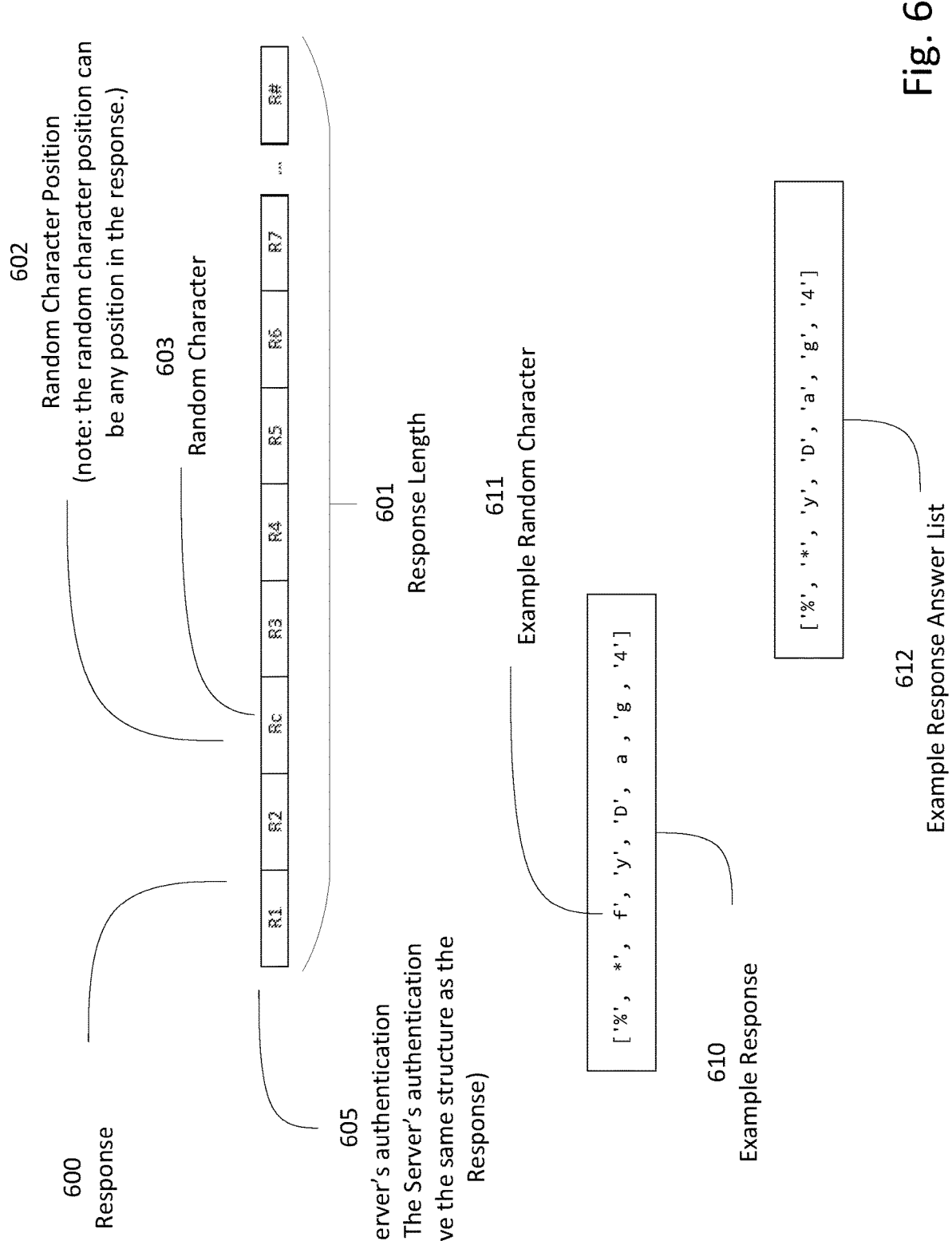
FIG. 6 depicts the structure for the response, its components, and examples.

FIG. 6 illustrates the structure of the response 600, the response length 601, the random character position 602, the random character 603, the example response 610, and the example random character 611. The random character position 602 is determined and stored at the initialization of the authentication data between the client application 114 and the authentication server application 124.

Figure 7:
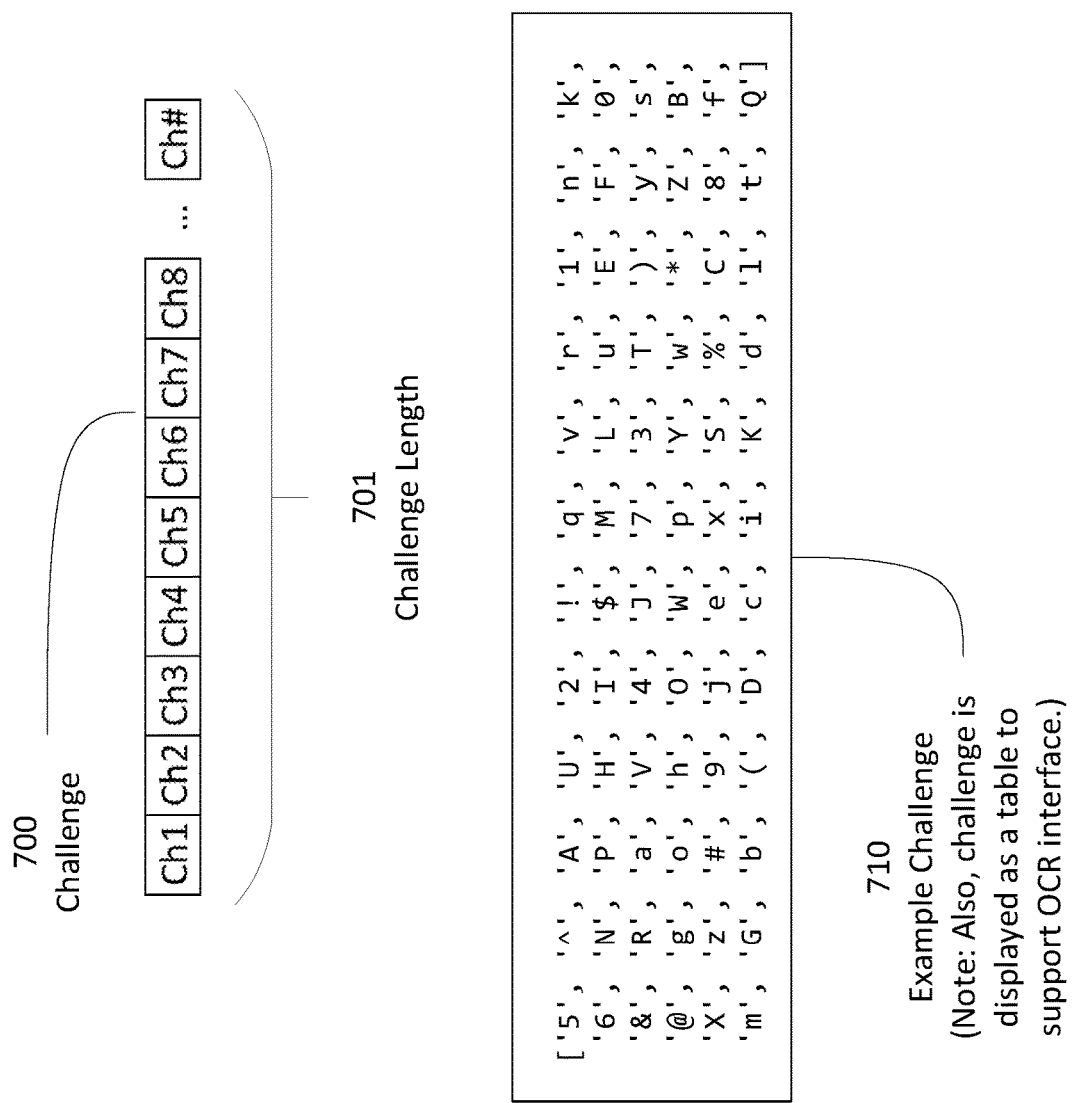
FIG. 7 depicts the structure for the challenge and an example of it.

FIG. 7 illustrates the structure of the challenge 700, the challenge length 701, and the embodiment 710. The challenge length 701 is determined and stored at the initialization of the authentication data between the client application 114 and the authentication server application 124. FIG. 7 further illustrates an embodiment 710 of a challenge 700 wherein the challenge 710 is a random shuffle of the character list 501.

FIG. 8 illustrates the structure of the two-dimensional active element mapping array 800, the active element mapping array length 801, and the example of the active element mapping array 810. The active element mapping array 800 comprising a first dimension wherein each element is a unique character comprising the characters in the character list 500 and a second dimension wherein each element is a unique number. FIG. 8 further illustrates an example 810 of a response character mapping array 800 as a two-dimensional array wherein the first dimensional comprises each character in the example character list 510, and a second dimension comprises a mapping of a set of unique numbers to each element of the first dimension. In the example embodiment 810, the unique numbers are in the range of −99 to 99. In an exemplary embodiment, the unique numbers of the second dimension are unbounded.

Figure 9:
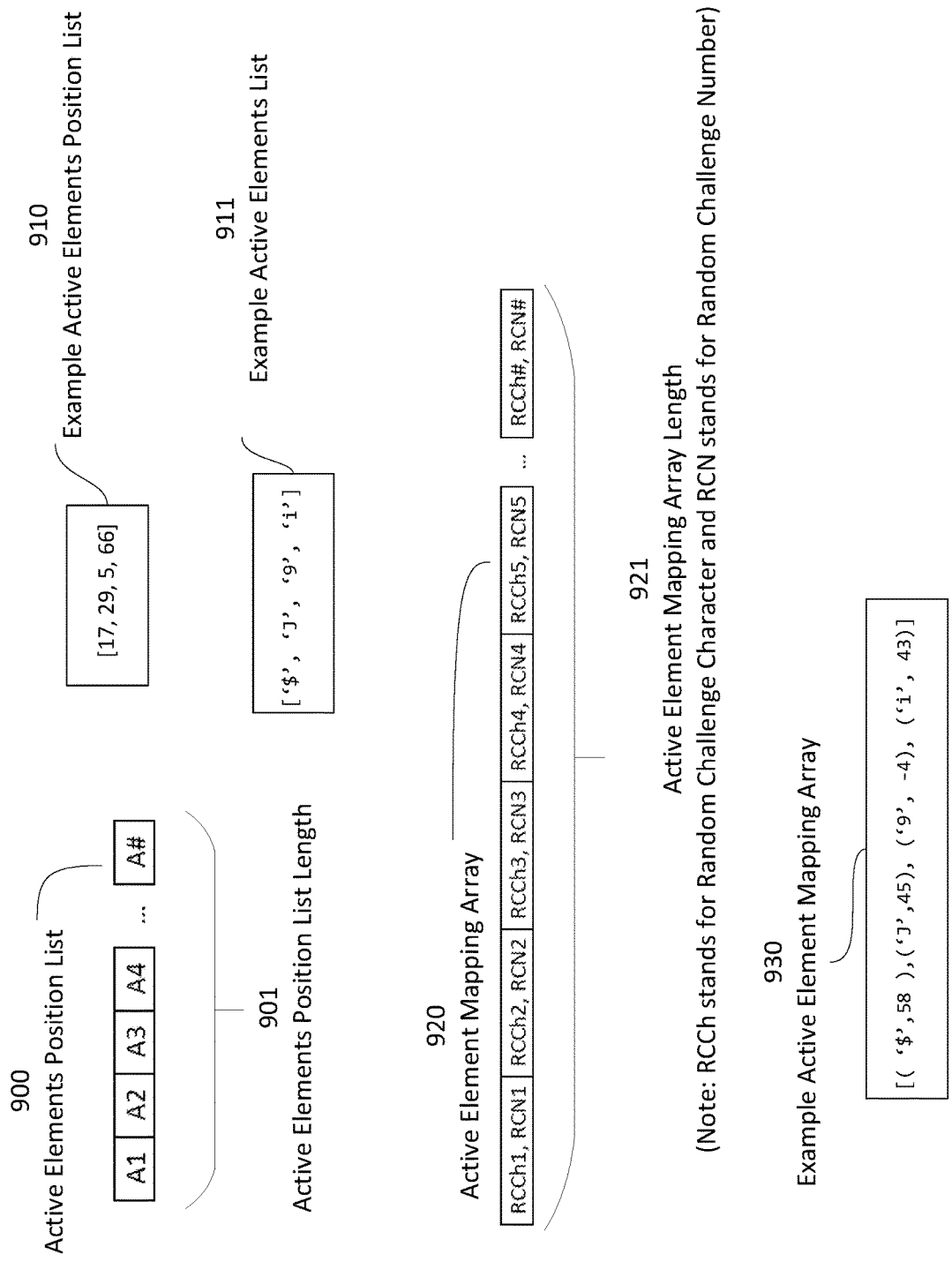
FIG. 9 depicts the structure for the active elements position list, the active element mapping array, and examples for both.

FIG. 9 illustrates the structure of the active elements position list 900, the active elements position list length 901, and the embodiment of the active elements position list 910 wherein the list comprises predetermined positions within the challenge 700. FIG. 9 further illustrates the structure of the active element mapping array 920, the active element mapping array length 921, and the embodiment of the active element mapping array 930.

FIG. 10 illustrates the structure of the formula set to character mapping array 1000 and the embodiment of the formula set to character mapping array 1010 wherein FIG. 10 further illustrates an embodiment of a formula set to character mapping array 1010 as a two-dimensional array wherein the first dimensional comprises a unique identifier, and a second dimension comprises lists of characters wherein each character of the character list 500 appears once. In the embodiment of the formula set to character mapping array 1010, the second dimension contains each of the characters in the embodiment of the character list 510 once.

FIG. 11 illustrates the structure of the formula set to formula mapping array 1100 and the embodiment of the formula set to formula mapping array 1110. The formula set to formula mapping array 1100 comprises a two-dimensional array wherein the first dimensional comprises the unique identifiers from the first dimension of the formula set to character mapping array 1000, and a second dimension comprises formulas. FIG. 11 further illustrates an embodiment of a formula set to formula mapping array 1110 wherein the first dimensional comprises the unique identifiers from the first dimension the embodiment of the formula set to character mapping array 1010 and a second dimension comprising formulas comprising variables referencing the active elements position list 910 and formulas in the second dimension of the formula set to formula mapping array 1110.

FIG. 12 illustrates the structure of the two-dimensional response character mapping array 1200, the response character mapping array length 1201, and the example of the response character mapping array 1210. The response character mapping array 1200 comprising a first dimension wherein each element is a unique character comprising the characters in the character list 500 and a second dimension wherein each element is a unique number in the range of one to the length of the character list 500. FIG. 12 further illustrates an example 1210 of a response character mapping array 1200 as a two-dimensional array wherein the first dimensional comprises each character in the character list 510, and a second dimension comprises unique numbers in the range of one to the length of the character list 510.

FIG. 1 further illustrates the authentication of the client application 114 by the authentication server application 124. In "Step 5", the client application 114 sends a request for authentication to the authentication server 120. In "Step 6", the authentication server application 124 generates a challenge using data from the client information and challenges database 125 and sends the challenge to the client application 114 user device 110.

Figure 2:
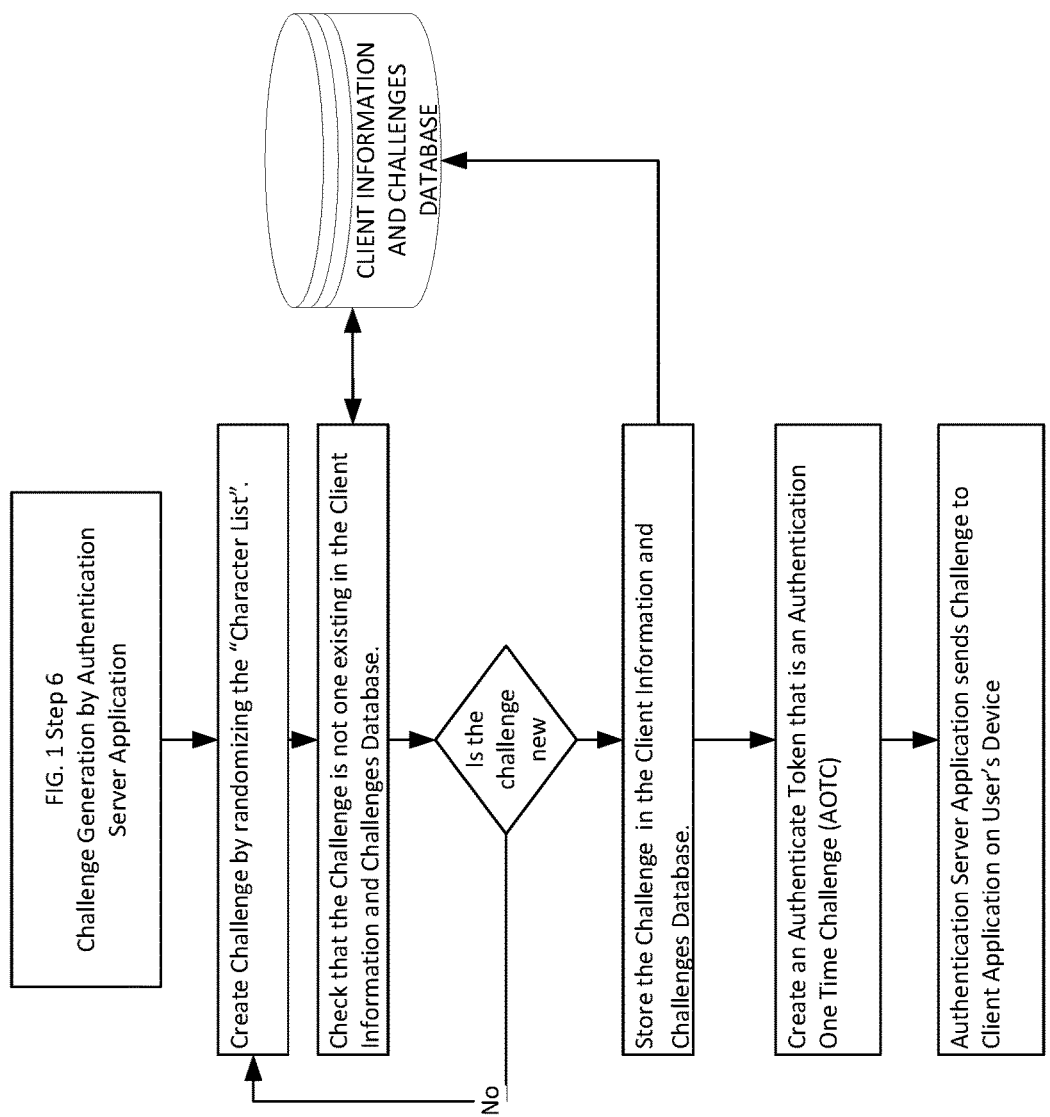
FIG. 2 depicts the steps for challenge generation by an authentication server application.

FIG. 2 shows the process for challenge generation by the authentication server application 124. The process comprises the authentication server application 124 generating a challenge 700 by randomizing the character list 500, checking that the randomized list has not been created before by checking against the client information and challenges database 125, repeating generating challenges until a unique challenge is created. Next, the authentication server application 124 generates a Server's Authentication 605 that the client application 114 will use to verify that the challenge 700 is from the authentication server application 124. The AOTC (Authenticated One Time Challenge) stands for the One Time Challenge generated by the Server+the Server's authentication. The authentication server application 124 generates the Server's Authentication 605 in the same manner that the client application 114 generates the response. The server's Active Elements are on predetermined positions (known by both parties or determined at initialization) that are different from the positions for the client's Active Elements, so the server's authentication cannot be the same as the client's response or the server can use the same Active Elements positions like the client but different formulas. Next, the authentication server application 124 transmits both the Server's Authentication 605 and the challenge 700 to the client application 114.

In FIG. 1 "Step 7", the authentication server application 124 sends the challenge 700 and the Server's Authentication 605 to the client application 114 user's device 110. In FIG. 1 "Step 8", the challenge 700 and the Server's Authentication 605 are directed to the user device 110.

Figure 3:
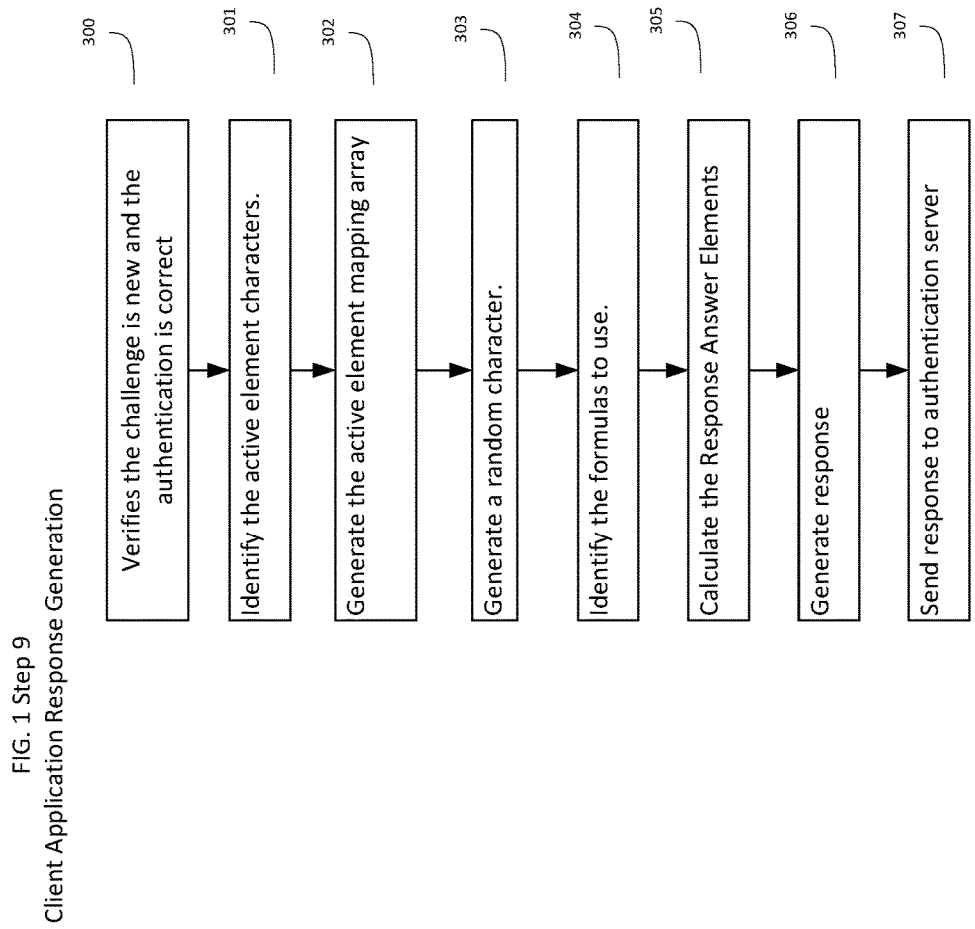
FIG. 3 depicts the steps for client application response generation.

In FIG. 1 "Step 9", the client application 114 user verifies the challenge is new and verifies the Server's Authentication 605, creates the response 600 and sends the response to the authentication server 120 for verification. FIG. 3 shows the steps in the process for response generation by the client application 114. The process for creating a response 600 begins with step 300 with the client application 114 verifying that the challenge is new and the authentication is correct. Next the client application 114 retrieves the active elements position list 900 from the client database 115. Next, the client application 114 identifies the characters in the challenge 700 that match the active elements positions identified in the active elements position list 900. FIG. 9 further illustrates an example of the active elements position list 910. When these values are matched to the challenge example 710, the result is the active elements list 911.

In step 302, the client application 114 retrieves the response character mapping array 800 from the client database 115. Next, the client application 114 generates an active element mapping array 920 by building an array wherein the first dimension comprises the characters in the active elements list 911, and the second dimension comprises the numbers in the response character mapping array 800 that match the characters in the first dimension. FIG. 9 further illustrates an example of the active element mapping array 930 generated using the example active elements list 911, and the example response character mapping array 810.

In step 303, the client application 114 retrieves the character list 500 from the client database 115. Next, the client application 114 generates a random character by selecting a random character from the character list 500. FIG. 6 further illustrates an example of a response 610 with response length 601 of eight with the generated random character 611 in the third position of the response 610.

In step 304, the client application 114 retrieves the formula set to character mapping array 1000 and the formula set to formula mapping array 1100 from the client database 115. Next, the client application 114 identifies the formula set identifier in the formula set to character mapping array 1000 that contains the random character 603. Next, the client application 114 identifies the formulas in the formula set to formula mapping array 1100 that are associated with the identified formula set identifier. FIG. 10 further illustrates an example of the formula set id 1011 identified by identifying the formula set id in the example formula set to character mapping array 1010 associated with the list of mapped characters, which contains the example random character 611. FIG. 11 further illustrates an example of formulas 1111 identified as associated with the example identified formula set identifier 1011.

In step 305, the client application 114 retrieves the response character mapping array 1200 from the client database 115. Next, the client application 114 generates the response answers list by substituting the numbers in the active element mapping array 920 into the identified formulas to calculate a value for each formula wherein each formula array position corresponds with a response answer element. Next, each response answer element has a formula applied that transforms the number into a value in the range of one to character list length 501. Next, for each transformed response answer element, the client application 114 identifies the character in the response character mapping array 1200 that match the values. FIG. 13 illustrates an example of step 305 generation of the response answers list 1310 using example active element values 1300 from example active element mapping array 930 substituted into the example formulas 1111.

In step 306, the client application 114 generates the response 600 by inserting, into the response answer list 612, the random character 603 in the random character position 602 wherein the characters in the response answer list are shifted. FIG. 6 further illustrates an example of a response 610 generated by inserting into the example response answer list 612 the random character 611 in the third position of the response 610. In step 307, the client application 114 sends the response to the authentication server 120.

Figure 4:
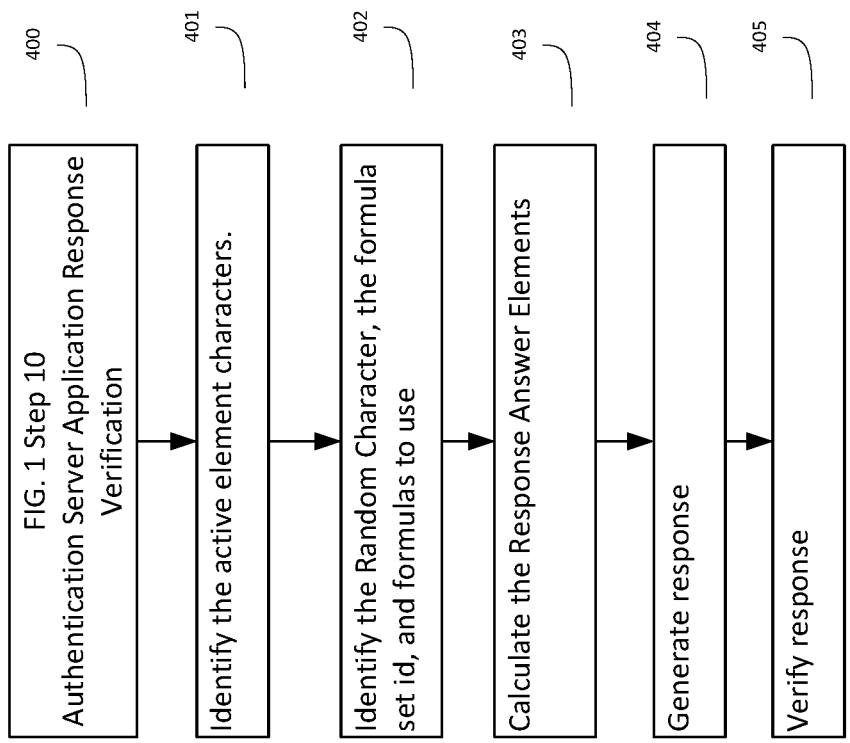
FIG. 4 depicts the steps for authentication server application response verification.

In FIG. 1, "Step 10," the authentication server application 124 verifies the response 600. FIG. 4 shows the steps in the process for response verification by the authentication server application 124. The process for verifying the response 600 begins with step 401 with the authentication server application 124 retrieving the active elements position list 900 from the client information and challenges database 125. Next, the authentication server application 124 identifies the characters in the challenge 700 that match the active elements positions identified in the active elements position list 900. FIG. 9 further illustrates an example of the active elements position list 910. When these values are matched to the challenge example 710, the result is the active elements list 911.

In step 402, the authentication server application 124 retrieves the random character position, the formula set to character mapping array 1000, and the formula set to formula mapping array 1100 from the client information and challenges database 125. Next, the authentication server application 124 identifies the random character 603 in the random character position 602 in the response. Next, the authentication server application 124 identifies the formula set identifier in the formula set to character mapping array 1000 that contains the random character 603. Next, the authentication server application 124 identifies the formulas in the formula set to formula mapping array 1100 that are associated with the identified formula set identifier.

In step 403, the authentication server application 124 retrieves the response character mapping array 1200 from the client information and challenges database 125. Next, the authentication server application 124 generates the response answers list by substituting the numbers in the active element mapping array 920 into the identified formulas to calculate a value for each formula wherein each formula array position corresponds with a response answer element. Next, each response answer element has a formula applied that transforms the number into a value in the range of one to character list length 501. Next, for each transformed response answer element, the authentication server application 124 identifies the character in the response character mapping array 1200 that match the values. FIG. 13 further illustrates an example of step 403 generation of the response answers list 1310 using example active element values 1300 from example active element mapping array 930 substituted into the example formulas 1111.

In step 404, authentication server application 124 generates the response 600 by inserting, into the response answer list 612, the random character 603 in the random character position 602 wherein the characters in the response answer list are shifted. FIG. 6 further illustrates an example of a response 610 generated by inserting into the example response answer list 612 the random character 611 in the third position of the response 610.

In step 405, authentication server application 124 creates an authentication response by verifying that the response 600 received from the user device 110 is the same as the response 600 generated by the authentication server 120 in step 404. Matching responses authenticate the client application 114.

Exemplary Embodiment of a Method for Secure Communication.

Figure 14:
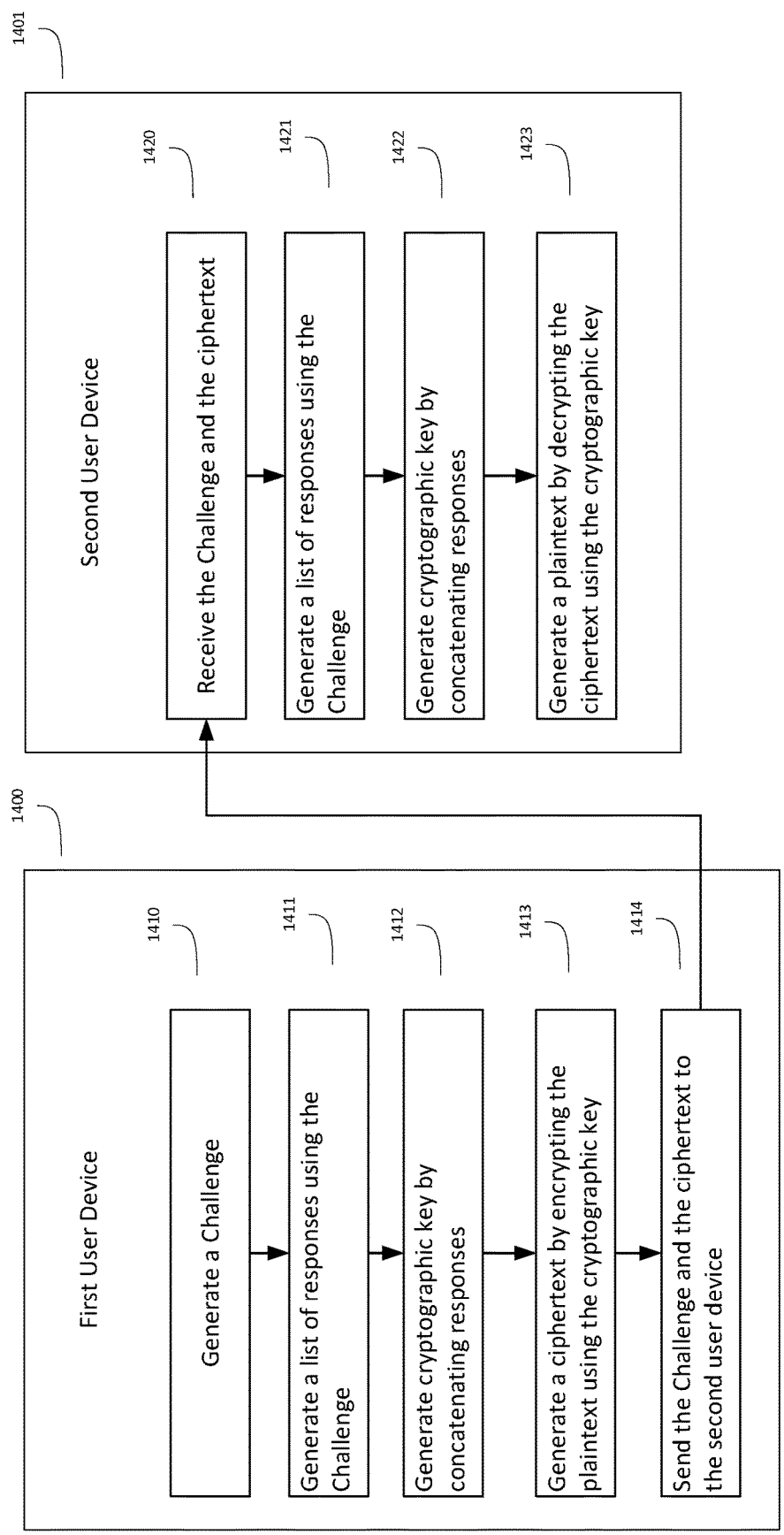
FIG. 14 depicts an exemplary embodiment of a method for secure communication.

FIG. 14 illustrates an exemplary embodiment of a system for providing secure communication and transaction signing, between two user devices. The first user device 1400 initiates the secure communication. In the first step 1410, the first user device 1400 generates a Challenge 700. Next 1411, the first user device 1400 generates a list of responses using the formulas in the formula set to formula mapping array 1100 and data derived from the Challenge 700. Next 1412, the responses 600 are concatenated to create a cryptographic key. Next 1413, the first user device generates a ciphertext by encrypting the plaintext using the cryptographic key. Next 1414, the first user device sends the Challenge 700 and the ciphertext to the second user device. The second user device then generates a list of responses 1421 using the formulas in the formula set to formula mapping array 1100 and data derived from the Challenge 700. Next 1422, the responses 600 are concatenated to create a cryptographic key. Next 1423, the second user device generates the plaintext by decrypting the ciphertext using the cryptographic key.

If the plaintext is longer than the cryptographic key another cryptographic key is created from the responses where each response is multiplied by two creating another cryptographic key that is concatenated to the first cryptographic key to create a new longer final cryptographic key. If the plaintext is still longer than the two concatenated keys the multiplying method is repeated incrementing the multiplier until the concatenated keys are equal to or greater than the length of the plaintext. In this embodiment, the series of multipliers used to multiply the responses is not limited to the set of natural numbers and can be any series the two user devices agree upon. This embodiment is an improvement over existing methods for providing secure communication and transaction signing because the statistical probability that concatenated keys are identical is highly unlikely and the ability by attacker to break the code is ineffective as the one proposed by Charles Babbage.

Additionally, this embodiment generates a key length at least as large as the message that is only used once which is what Claude Shannon showed to achieve the so-called perfect secrecy. Because in this embodiment the challenge 700 accepts multiple valid responses 600 there are an infinite number of ways to use these responses 600 to create a final cryptographic key of a length agreed upon by the parties.

This embodiment may be further improved with respect to the security associated with transaction signing, by the first user device 1400 sending an AOTC and a request for signature to the second user device 1401.

I claim:

1. A method for providing strong authentication with a token method comprising:
 registering a user device by an authentication server by:
  generating, by the authentication server, a response length comprising a number, the authentication server comprising a processor, a memory, and a transceiver;
  storing, on the authentication server, the response length;
  transmitting, by the authentication server, the response length to the user device;
  storing, by the user device, the response length, the user device comprising a processor, a memory, and a transceiver;
  generating, by the authentication server, a challenge length comprising a number;
  storing, on the authentication server, the challenge length;
  transmitting, by the authentication server, the challenge length to the user device;
  storing, by the user device, the challenge length;
  generating, by the authentication server, a character list comprising a plurality of unique characters where the number of elements equal to the challenge length;
  storing, on the authentication server, the character list;
  transmitting, by the authentication server, the character list to the user device;
  storing, by the user device, the character list;
  generating, by the authentication server, a two-dimensional response character mapping array comprising:
   a first response character mapping array dimension wherein each element is a unique character and the first response character mapping array dimension comprising each character in the character list and a second response character mapping array dimension wherein each element is a unique number in the range of one to the length of the character list;
  storing, on the authentication server, the response character mapping array;
  transmitting, by the authentication server, the response character mapping array to the user device;
  storing, by the user device, the response character mapping array;
  generating, by the authentication server, a two-dimensional active element mapping array comprising:
   a first active element mapping array dimension wherein each element is a unique character and the first active element mapping array dimension comprising each character in the character list and a second active element mapping array dimension wherein each element is a unique non-zero number;
  storing, on the authentication server, the active element mapping array;
  transmitting, by the authentication server, the active element mapping array to the user device;
  storing, by the user device, the active element mapping array;
  generating, by the authentication server, an active elements position list comprising numbers representing element positions in a challenge;
  storing, on the authentication server, the active elements position list;
  transmitting, by the authentication server, the active elements position list to the user device;
  storing, by the user device, the active element list;
  generating, by the authentication server, a two-dimensional formula set to character mapping array comprising:
   a first formula set to character mapping dimension comprising unique formula set identifiers and a second formula set to character mapping dimension comprising unique characters wherein each element is a unique character and the second formula set to character mapping dimension comprising each character in the character list;
  storing, on the authentication server, the formula set to character mapping array;
  transmitting, by the authentication server, the formula set to character mapping array to the user device;
  storing, by the user device, the formula set to character mapping array;
  generating, by the authentication server, a two-dimensional formula set to formula mapping array comprising:
   a first formula set to formula mapping array dimension comprising unique formula set identifiers wherein the number of elements in the first formula set to formula mapping array dimension is one to response length minus one and a second formula set to formula mapping array dimension comprising formulas further comprising variables representing elements from the active elements position list and formula elements from the second formula set to formula mapping array dimension;
  storing, on the authentication server, the formula set to formula mapping array;
  transmitting, by the authentication server, the formula set to formula mapping array to the user device;
  storing, by the user device, the formula set to formula mapping array;
  generating, by the authentication server, a random character position wherein the random character is a random number in the range of one to the response length;
  storing, on the authentication server, the random character position;
  transmitting, by the authentication server, the random character position to the user device;
  storing, by the user device, the random character position;
 challenging the user by the authentication server by:
  generating by, the authentication server, a challenge comprising a plurality of unique characters wherein the challenge is generated by randomizing the characters in the character list;

generating by, the authentication server, a Server's Authentication, the Server's Authentication generated by:
  identifying an active challenge character list, by the authentication server, by identifying the characters in the challenge that are in the positions identified by the active elements position list;
  selecting, by the authentication server, a response random character from the character list;
  identifying, by the authentication server, a response formula set id by locating the response random character in the second formula set to character mapping dimension and identifying the associated element in the first formula set to character mapping dimension;
  calculating, by the authentication server, a response formula list comprising a list of formulas wherein the list is the set of formulas in the second formula set to formula mapping array dimension associated with the first formula set to formula mapping array dimension with the formula set id matching the response formula set id;
  calculating, by the authentication server, a response result list comprising numbers that are the result of calculating the formulas in the response formula list substituting variables representing elements from the active elements position list with associated values in the challenge and elements from the second formula set to formula mapping array dimension;
  calculating, by the authentication server, a response transformed result list wherein each element of the response formula list is mapped to a value in the second response character mapping array dimension;
  generating, by the authentication server, a response answer list by locating, for each element of the response transformed result list, the matching value in the second response character mapping array dimension and identifying the associated character in the first response character mapping array dimension; and
  generating, by the authentication server, a Server's Authentication, by inserting, into the response answer list the response random character in the random character position wherein the response answer list elements are shifted; and
sending by, the authentication server, the challenge and the Server's Authentication to the user device;
Receiving by the authentication server a response comprising a list of characters from the user device, the response generated by:
  verifying, by the user device, the challenge is new by verifying that the challenge has not been stored by the user device;
  verifying the Server's Authentication by the user device by:
    generating, by the user device, a verification Server's Authentication comprising a list of characters and further comprising the steps:
      identifying a verification active challenge character list, by the user device, by identifying the characters in the challenge that are in the positions identified by the active elements position list;
      identifying, by the user device, a verification random character by locating the character in the Server's Authentication that is in the random character position;
      determining, by the user device, a verification formula set id by locating the verification random character in the second formula set to character mapping dimension and identifying the associated element in the first formula set to character mapping dimension;
      calculating, by the user device, a verification formula list comprising a list of formulas wherein the list is the set of formulas in the second formula set to formula mapping array dimension associated with the first formula set to formula mapping array dimension with the formula set id matching the verification formula set id;
      calculating, by the user device, a verification result list comprising numbers that are the result of calculating the formulas in the verification formula list substituting variables representing elements from the active elements position list with associated values in the challenge and elements from the second formula set to formula mapping array dimension;
      calculating, by the user device, a verification transformed result list wherein each element of the verification formula list is mapped to a value in the second response character mapping array dimension;
      generating, by the user device, a verification character list by locating, for each element of the verification transformed result list, the matching value in the second response character mapping array dimension and identifying the associated character in the first response character mapping array dimension;
      generating, by the user device, a verification Server's Authentication, by inserting, into the verification character list the verification random character in the random character position wherein the verification character list elements are shifted; and
    verifying, by the user device, the Server's Authentication and the verification Server's Authentication are the same;
  identifying an active challenge character list, by the user device, by identifying the characters in the challenge that are in the positions identified by the active elements position list;
  selecting, by the user device, a response random character from the character list;
  identifying, by the user device, a response formula set id by locating the the response random character in the second formula set to character mapping dimension and identifying the associated element in the first formula set to character mapping dimension;
  calculating, by the user device, a response formula list comprising a list of formulas wherein the list is the set of formulas in the second formula set to formula mapping array dimension associated with the first formula set to formula mapping array dimension with the formula set id matching the response formula set id;
  calculating, by the user device, a response result list comprising numbers that are the result of calculating the formulas in the response formula list substituting variables representing elements from the active elements position list with associated values in the challenge and elements from the second formula set to formula mapping array dimension;

calculating, by the user device, a response transformed result list wherein each element of the response formula list is mapped to a value in the second response character mapping array dimension;

generating, by the user device, a response answer list by locating, for each element of the response transformed result list, the matching value in the second response character mapping array dimension and identifying the associated character in the first response character mapping array dimension; and generating, by the user device, a response, by inserting, into the response answer list the response random character in the random character position wherein the response answer list elements are shifted;

transmitting, by the user device, the response to the authentication server;

Verifying the response by the authentication server by:

generating, by the authentication server, a verification response comprising a list of characters and further comprising the steps:

identifying a verification active challenge character list, by the authentication server, by identifying the characters in the challenge that are in the positions identified by the active elements position list;

identifying, by the authentication server, a verification random character by locating the character in the response that is in the random character position;

determining, by the authentication server, a verification formula set id by locating the verification random character in the second formula set to character mapping dimension and identifying the associated element in the first formula set to character mapping dimension;

calculating, by the authentication server, a verification formula list comprising a list of formulas wherein the list is the set of formulas in the second formula set to formula mapping array dimension associated with the first formula set to formula mapping array dimension with the formula set id matching the verification formula set id;

calculating, by the authentication server, a verification result list comprising numbers that are the result of calculating the formulas in the verification formula list substituting variables representing elements from the active elements position list with associated values in the challenge and elements from the second formula set to formula mapping array dimension;

calculating, by the authentication server, a verification transformed result list wherein each element of the verification formula list is mapped to a value in the second response character mapping array dimension;

generating, by the authentication server, a verification character list by locating, for each element of the verification transformed result list, the matching value in the second response character mapping array dimension and identifying the associated character in the first response character mapping array dimension; and generating, by the authentication server, a verification response, by inserting, into the verification character list the verification random character in the random character position wherein the verification character list elements are shifted;

calculating, by the authentication server, an authentication response by comparing the response and the verification response.

2. The method for providing authentication of claim 1, wherein the elements of the response transformed result list, and the verification transformed result list are calculated using $abs(int(X))\% Y+1$ where X is the element value, and Y is the challenge length.

3. The method for providing authentication of claim 1, wherein the elements of the response transformed result list, and the verification transformed result list are calculated using $abs(int(X))\% Y+1$ where X is the element value, and Y is the challenge length and the second active element mapping array dimension consisting of positive numbers.

4. A method for providing secure communication and transaction signing method comprising:

registering a second user device by a first user device by:

generating, by the first user device, a challenge length comprising a number, the first user device comprising a processor, a memory, and a transceiver;

storing, on the first user device, the challenge length;

transmitting, by the first user device, the challenge length to the second user device;

storing, by the second user device, the challenge length, the second user device comprising a processor, a memory, and a transceiver;

generating, by the first user device, a character list comprising a plurality of unique characters where the number of elements equal to the challenge length;

storing, on the first user device, the character list;

generating, by the first user device, a two-dimensional active element mapping array comprising:

a first active element mapping array dimension wherein each element is a unique character and the first active element mapping array dimension comprising each character in the character list and a second active element mapping array dimension wherein each element is a unique non-zero number;

storing, on the first user device, the active element mapping array;

transmitting, by the first user device, the active element mapping array to the second user device;

storing, by the second user device, the active element mapping array;

generating, by the first user device, an active elements position list comprising numbers representing element positions in a challenge;

storing, on the first user device, the active elements position list;

transmitting, by the first user device, the active elements position list to the second user device;

storing, by the second user device, the active element list;

generating, by the first user device, a two-dimensional formula set to formula mapping array comprising:

a first formula set to formula mapping array dimension comprising unique formula set identifiers wherein the number of elements in the first formula set to formula mapping array dimension is one to response length and a second formula set to formula mapping array dimension comprising formulas further comprising variables representing elements from the active elements position list and formula elements from the second formula set to formula mapping array dimension;

storing, on the first user device, the formula set to formula mapping array;

transmitting, by the first user device, the formula set to formula mapping array to the second user device; and storing, by the second user device, the formula set to formula mapping array;

generating by, the first user device, a challenge comprising a plurality of unique characters wherein the challenge is generated by randomizing the characters in the character list;

generating by, the first user device, a first cryptographic key, the first cryptographic key generated by:

identifying an active challenge character list, by the first user device, by identifying the characters in the challenge that are in the positions identified by the active elements position list;

calculating, by the first user device, a response result list comprising a list of responses wherein each response is generated by:

calculating, by the first user device, a first response formula list comprising a list of formulas wherein the list is the set of formulas in the second formula set to formula mapping array dimension associated with the first formula set to formula mapping array dimension with the formula set id matching the response being calculated;

calculating, by the first user device, a first response result list comprising numbers that are the result of calculating the formulas in the first response formula list substituting variables representing elements from the active elements position list with associated values in the challenge and elements from the second formula set to formula mapping array dimension;

calculating, by the first user device, a first response transformed result list wherein each element of the first response formula list is mapped to a value in the second response character mapping array dimension; and generating, by the first user device, a first response answer list by locating, for each element of the first response transformed result list, the matching value in the second response character mapping array dimension and identifying the associated character in the first response character mapping array dimension; and generating, by the first user device, the first cryptographic key by concatenating each response in the first response result list;

transmitting, by the first user device, the challenge to the second user device;

generating by, the second user device, a second cryptographic key, the second cryptographic key generated by:

identifying an active challenge character list, by the second user device, by identifying the characters in the challenge that are in the positions identified by the active elements position list;

calculating, by the second user device, a second response result list comprising a list of responses wherein each response is generated by:

calculating, by the second user device, a second response formula list comprising a list of formulas wherein the list is the set of formulas in the second formula set to formula mapping array dimension associated with the first formula set to formula mapping array dimension with the formula set id matching the response being calculated;

calculating, by the second user device, a second response result list comprising numbers that are the result of calculating the formulas in the second response formula list substituting variables representing elements from the active elements position list with associated values in the challenge and elements from the second formula set to formula mapping array dimension;

calculating, by the second user device, a second response transformed result list wherein each element of the second response formula list is mapped to a value in the second response character mapping array dimension;

generating, by the second user device, a second response answer list by locating, for each element of the second response transformed result list, the matching value in the second response character mapping array dimension and identifying the associated character in the first response character mapping array dimension; and generating, by the second user device, the second cryptographic key by concatenating each response in the second response result list;

generating a ciphertext, by the first user device, by encrypting a plaintext using the first cryptographic key;

transmitting, by the first user device, the ciphertext to the second user device; and generating a decrypted plaintext, by the second user device, by decrypting the ciphertext using the second cryptographic key.

5. The method for providing secure communication and transaction signing of claim 4, wherein a cryptographic key length is increased by:

generating a third response transformed result list, by the first user device, by multiplying each response in the first response transformed result list by a integer;

generating, by the first user device, a third response answer list by locating, for each element of the third response transformed result list, the matching value in the second response character mapping array dimension and identifying the associated character in the first response character mapping array dimension;

generating, by the first user device, the third cryptographic key by concatenating the first cryptographic key and each response in the third response result list;

generating a fourth response transformed result list, by the second user device, by multiplying each response in the second response transformed result list by a integer;

generating, by the second user device, a fourth response answer list by locating, for each element of the fourth response transformed result list, the matching value in the second response character mapping array dimension and identifying the associated character in the first response character mapping array dimension;

generating, by the second user device, the fourth cryptographic key by concatenating the second cryptographic key and each response in the fourth response result list;

generating a second ciphertext, by the first user device, by encrypting a second plaintext using the third cryptographic key;

transmitting, by the first user device, the second ciphertext to the second user device; and generating a second decrypted plaintext, by the second user device, by decrypting the second ciphertext using the fourth cryptographic key.

* * * * *